(12) United States Patent
Foss, Jr. et al.

(10) Patent No.: US 7,676,395 B2
(45) Date of Patent: Mar. 9, 2010

(54) ON-US CASH WITHDRAWAL AT A POINT-OF-SALE

(75) Inventors: Sheldon H. Foss, Jr., Suwanee, GA (US); Dwight Harris, Alpharetta, GA (US); Krishnamoorthy Srinvasan, Marietta, GA (US)

(73) Assignee: Compucredit Intellectual Property Holdings Corp. II, Las Vegas, NV (US)

( * ) Notice: Subject to any disclaimer, the term of this patent is extended or adjusted under 35 U.S.C. 154(b) by 457 days.

(21) Appl. No.: 11/139,772

(22) Filed: May 27, 2005
(Under 37 CFR 1.47)

(65) Prior Publication Data

US 2007/0007333 A1 Jan. 11, 2007

Related U.S. Application Data

(63) Continuation-in-part of application No. 10/685,277, filed on Oct. 14, 2003.

(60) Provisional application No. 60/618,096, filed on Oct. 13, 2004.

(51) Int. Cl.
*G06Q 20/00* (2006.01)

(52) U.S. Cl. ............... 705/16; 705/43; 705/44; 705/39

(58) Field of Classification Search ............ 705/16
See application file for complete search history.

(56) References Cited

U.S. PATENT DOCUMENTS

| | | | | |
|---|---|---|---|---|
| 5,365,046 A | * | 11/1994 | Haymann | 235/380 |
| 5,432,326 A | * | 7/1995 | Noblett et al. | 235/380 |
| 5,453,601 A | * | 9/1995 | Rosen | 705/65 |
| 5,883,810 A | * | 3/1999 | Franklin et al. | 700/232 |
| 5,884,288 A | | 3/1999 | Chang et al. | |
| 5,917,168 A | * | 6/1999 | Nakamura et al. | 235/379 |
| 5,920,847 A | | 7/1999 | Kolling et al. | |
| 5,953,710 A | * | 9/1999 | Fleming | 705/38 |
| 5,974,146 A | | 10/1999 | Randle et al. | |
| 5,999,596 A | | 12/1999 | Walker et al. | |
| 2003/0061157 A1 | * | 3/2003 | Hirka et al. | 705/39 |
| 2003/0080185 A1 | * | 5/2003 | Werther | 235/380 |

\* cited by examiner

*Primary Examiner*—F. Zeender
*Assistant Examiner*—Luna Champagne
(74) *Attorney, Agent, or Firm*—Sentry Law Group

(57) ABSTRACT

Various embodiments of systems, methods, computer programs, merchant terminals, etc. for providing an on-us cash withdrawal service at a point-of-sale are provided. One embodiment comprises a method for providing a cash withdrawal service at a point-of-sale. One such method comprises: issuing an association-branded financial card to a cardholder, the association-branded financial card comprising an association account number corresponding to a credit card association and a proprietary account number corresponding to an issuer of the association-branded financial card; at a merchant terminal, reading the proprietary account number from the association-branded financial card and receiving a cash withdrawal amount; providing the proprietary account number and the cash withdrawal amount to a switch associated with the issuer; at the switch, determining the association account number based on the proprietary account number; and authorizing the cash withdrawal amount by submitting an authorization request to a issuing host, the authorization request including the association account number and the cash withdrawal amount.

6 Claims, 6 Drawing Sheets

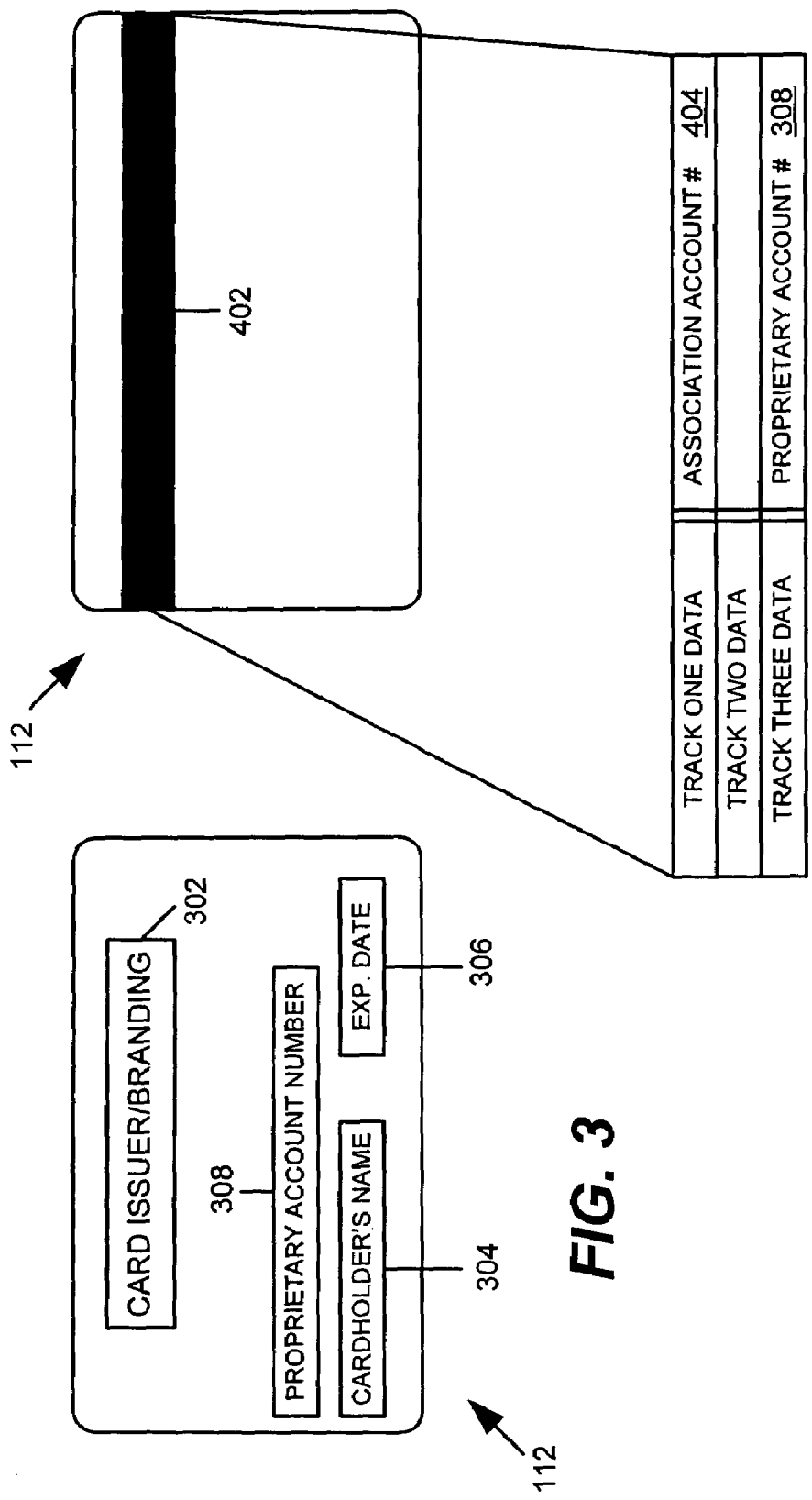

ON-US CASH WITHDRAWAL AT A POINT-OF-SALE

CROSS-REFERENCE TO RELATED APPLICATIONS

This application is a continuation-in-part application of copending U.S. patent application Ser. No. 10/685,277, entitled "System, Method and Apparatus for Providing Financial Services," filed on Oct. 14, 2003, which is related to U.S. patent application Ser. No. 10/645,949, entitled "System for Providing a Checkless Checking Account," filed on Aug. 22, 2003 and U.S. patent application Ser. No. 10/646,150, entitled "System and Method for Dynamically Managing a Financial Account," filed on Aug. 22, 2003, all of which are incorporated by reference in their entirety. This application also claims the benefit of U.S. Provisional Application Ser. No. 60/618,096, entitled "On-Us Cash Withdrawal at a Point-of-Sale," filed on Oct. 13, 2004, which is hereby incorporated by reference in its entirety.

BACKGROUND

Currently, there are various types of financial services cards (e.g., debit cards, credit cards, stored value cards, etc.). These and other types of cards enable the cardholder to make purchases against the associated account, as well as withdraw money from the account. Typically, the cardholder withdraws money from the account at an automated teller machine (ATM), which may be part of the card issuer's network or an affiliated network. As the use of financial services cards has become nearly ubiquitous, various point-of-sale terminals have been developed that automate the process of using financial services cards at retail locations. Some of these systems facilitate a process whereby the cardholder may withdraw cash at the point-of-sale. In order to withdraw cash at the point-of-sale, however, the cardholder must make a retail purchase. In these situations, the cash withdrawal amount is typically added to the amount of the retail purchase and the entire transaction is processed as an integrated retail purchase.

Despite the plethora of financial services cards currently available, there is a need in the art for improved systems, methods, services, etc. for enabling a cardholder to withdraw money from a financial services account.

SUMMARY

Various embodiments of systems, methods, computer programs, merchant terminals, etc. for providing an on-us cash withdrawal service at a point-of-sale are provided. One embodiment comprises a method for providing a cash withdrawal service at a point-of-sale. One such method comprises: determining a proprietary account number associated with a financial card; determining a cash withdrawal amount to be withdrawn from an account associated with the financial card; providing the proprietary account number and the cash withdrawal amount to a switch; translating the proprietary account number to a corresponding external account number; and authorizing the cash withdrawal amount based on the external account number.

Another embodiment is a method for providing an on-us cash withdrawal service. One such method comprises: reading a proprietary account number from an association-branded financial card corresponding to a cardholder; receiving a cash withdrawal amount; providing the proprietary account number and the cash withdrawal amount to an issuer switch; translating the proprietary account number to an association account number associated with the association-branded financial card; submitting an authorization request to an issuing host, the authorization request including the association account number and the cash withdrawal amount; and authorizing the cash withdrawal amount for the association account number.

Another such method comprises: issuing an association-branded financial card to a cardholder, the association-branded financial card comprising an association account number corresponding to a credit card association and a proprietary account number corresponding to an issuer of the association-branded financial card; at a merchant terminal, reading the proprietary account number from the association-branded financial card and receiving a cash withdrawal amount; providing the proprietary account number and the cash withdrawal amount to a switch associated with the issuer; at the switch, determining the association account number based on the proprietary account number; and authorizing the cash withdrawal amount by submitting an authorization request to a issuing host, the authorization request including the association account number and the cash withdrawal amount.

Yet another such method comprises: issuing an association-branded private label financial services card to a customer, the financial services card comprising a magnetic strip on which an association account number is stored on a first track and on which a proprietary account number associated with a card issuer is stored on a second track; and configuring a merchant terminal to read the second track in response to a request for a cash withdrawal amount and submit the proprietary account number to a switch for authorization.

Another embodiment is a system for providing an on-us cash withdrawal service. One such system comprises: a merchant terminal for reading a cardholder's financial card, the financial card comprising a magnetic strip on which an association account number is stored on a first track and on which a proprietary account number associated with a card issuer is stored on a second track; and logic associated with the merchant terminal for capturing the proprietary account number in response to a request for an on-us cash withdrawal.

BRIEF DESCRIPTION OF THE DRAWINGS

Other aspects, advantages and novel features of the invention will become more apparent from the following detailed description of exemplary embodiments of the invention when considered in conjunction with the following drawings.

FIG. 3 is a front view of an embodiment of an association-branded financial services card for implementing an on-us cash withdrawal at a point-of-sale.

FIG. 4 is a back view of the financial services card of FIG. 3.

DETAILED DESCRIPTION

Figure 1:
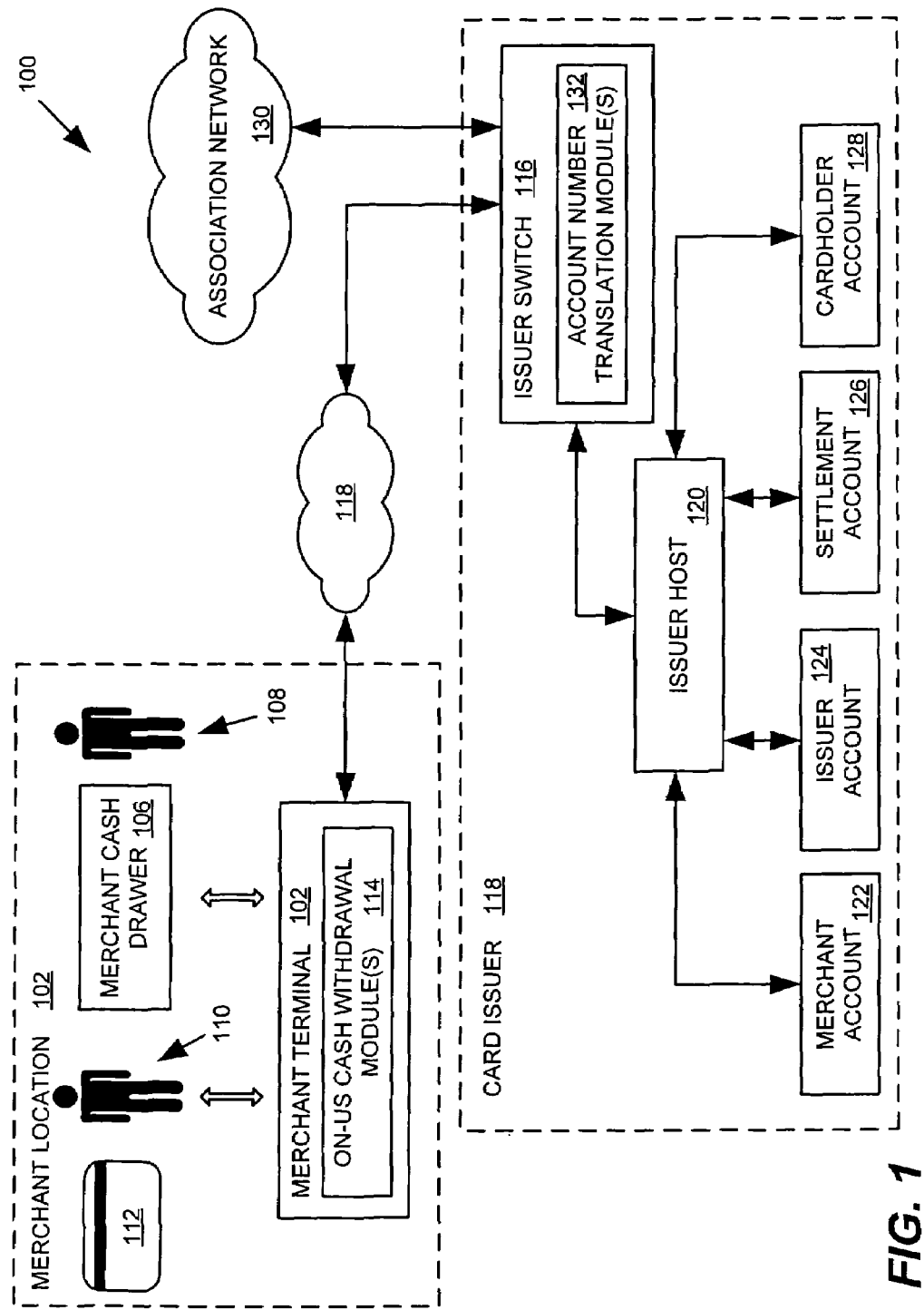
FIG. 1 is a block diagram of an embodiment of a system for implementing an on-us cash withdrawal (OUCW) service at a point-of-sale.

Various embodiments of systems, methods, computer programs, merchant terminals, etc. for providing an on-us cash withdrawal service at a point-of-sale are described below with reference to FIGS. 1-7. As an introductory matter, however, one of a number of embodiments of an on-us cash withdrawal (OUCW) service at a point-of-sale will be briefly described. As known in the art, an "on-us" transaction is an electronic banking transaction in which the acquirer of the transaction and the card issuer are the same institution (or perhaps an agent, affiliate, etc. of the institution). In general, the exemplary OUCW service involves an on-us transaction in which a holder of a financial services card (i.e., cardholder) withdraws cash from the corresponding financial services account via a merchant terminal located at a point-of-sale.

Although the OUCW service may be provided with any financial services card, in one embodiment, the OUCW service may be provided with an association-branded card (debit or credit). As known in the art, this type of card is typically a debit-based or credit-based card that is supported by an existing association (e.g., Visa®, MasterCard®, etc.). The association-branded card according to one embodiment of the present invention includes two account numbers on the magnetic stripe: (1) an association account number for facilitating typical association-based transactions using, for example, the Visa® or MasterCard® network; and (2) a proprietary account number defined by the card issuer (e.g., private label issuer) for facilitating the OUCW transaction. When using the association-branded card for retail purchases and the like, the point-of-sale hardware may read the association account number from the card and process the transaction via the association network. When using the association-branded card for the OUCW service, however, the point-of-sale hardware, merchant terminal, etc. may read the proprietary account number, rather than the association account number. As known in the art, some associations may require that all association-based transactions (which use the association account number) be processed in the same manner using the association network and, therefore, are subject to applicable association fees. It should be appreciated that the proprietary account number provides a unique mechanism for enabling the card issuer to support an OUCW transaction without having to access the association network.

In operation, when the OUCW transaction is initiated by the cardholder or the merchant agent, the merchant terminal (or other point-of-sale hardware) reads the proprietary account number from the card—rather than the association account number. The merchant terminal may then provide the proprietary account number, as well as the requested withdrawal amount, to a switch maintained by the card issuer. The issuer switch may include appropriate logic, functionality, etc. for mapping the proprietary account number to the corresponding association account number. The issuer switch may transmit a typical authorization request to an issuing host using the association account number. As known in the art, the issuing host may determine whether the cardholder's account has sufficient credit, funds, etc. to cover the requested withdrawal amount, or whether the OUCW transaction complies with any other aspects of the cardholder's account. It should be appreciated that, because the association account number is not captured at the point-of-sale, the OUCW may be processed without accessing the association network and without being subject to applicable associate fees and while complying with association guidelines.

Having described one embodiment of an OUCW service at a point-of-sale, various additional embodiments of systems, methods, merchant terminals, computer programs, etc. for providing an OUCW will be described with reference to FIGS. 1-7. FIG. 1 illustrates one embodiment of a system 100 for implementing an OUCW transaction. As illustrated in FIG. 1, system 100 comprises a merchant terminal 102 positioned at a merchant location 104 (e.g., retailer, check-cashing business, etc.). In this regard, merchant location 104 may include a merchant cash drawer 106 operated by a merchant agent 108. Merchant cash drawer 106 provides the source of cash for the OUCW transaction. In general, merchant terminal 102 provides the interface for enabling a cardholder 110 (or merchant agent 108) to initiate and perform the OUCW transaction using the cardholder's financial services card 112, which may be any suitable card such as a debit card, credit card, stored value card, etc.

Merchant terminal 102 includes on-us cash withdrawal module(s) 114 that generally comprise the logic, functionality, etc. for controlling the aspects of the OUCW transaction which occur at merchant terminal 102. For example, OUCW module(s) 114 control the user experience at merchant terminal 102 via a suitable user interface (not shown). OUCW module(s) 114 may also control communications with an issuer switch 116 via a communications interface (e.g., network 118). As described below in more detail, issuer switch 116 and an issuer host 120 provide the back-end processing of the OUCW transaction for card issuer 118. Depending on the type of financial services card used for the OUCW transaction, issuer host 120 may maintain various types of accounts (e.g., merchant account 122, issuer account 124, settlement account 126, cardholder account 128, etc.). For instance, host 120 may use merchant account 122, issuer account 124, settlement account 126, and cardholder account 128 to settle, reconcile, manage, etc. the flow of funds for the OUCW transaction. Issuer switch 116 may also interface with an association network 130 (e.g., the Visa® network, the MasterCard® network, etc.) for processing association-based transactions (e.g., retail purchases at merchant location 104). Issuer switch 116 includes account number translation module(s) 132 for controlling some of the back-end aspects of the OUCW transaction at issuer switch 116. Account number translation module(s) 132 provide a mechanism for translating, mapping, etc. a non-association account number to the corresponding association account number. As described below in more detail, various embodiments of the OUCW service may be provided via communication between, and logic provided by, OUCW module(s) 114 (at merchant terminal 102) and account number translation module(s) 132 (at issuer switch 116).

FIGS. 3 and 4 illustrate an embodiment of financial services card 112. In this embodiment, financial services card 112 comprises an association-branded card that includes, on a magnetic stripe 402, an association account number 404 and a proprietary account number 308. Association account number 404 may be stored on one track of data, while proprietary account number 308 is stored on another track of data (e.g., track three data). As illustrated in FIG. 3, proprietary account number 308 may also be embossed on the front of the card, along with the cardholder's name 304 and the expiration data 306 of the card. Additional indicia may be displayed on the front (or back) of the card (e.g., information identifying card issuer 118, branding information, etc.). Association account number 404 corresponds to an association network 130 (e.g., Visa®, MasterCard®, etc.) and may be used to facilitate association-based transactions at merchant location 104 or any other point-of-sale. Proprietary account number 308 comprises a unique account number defined by card issuer 118 at enrollment. Association account number 404 is used for association-based transactions via network 130, while proprietary account number 308 is reserved for the OUCW transaction.

Figure 2:
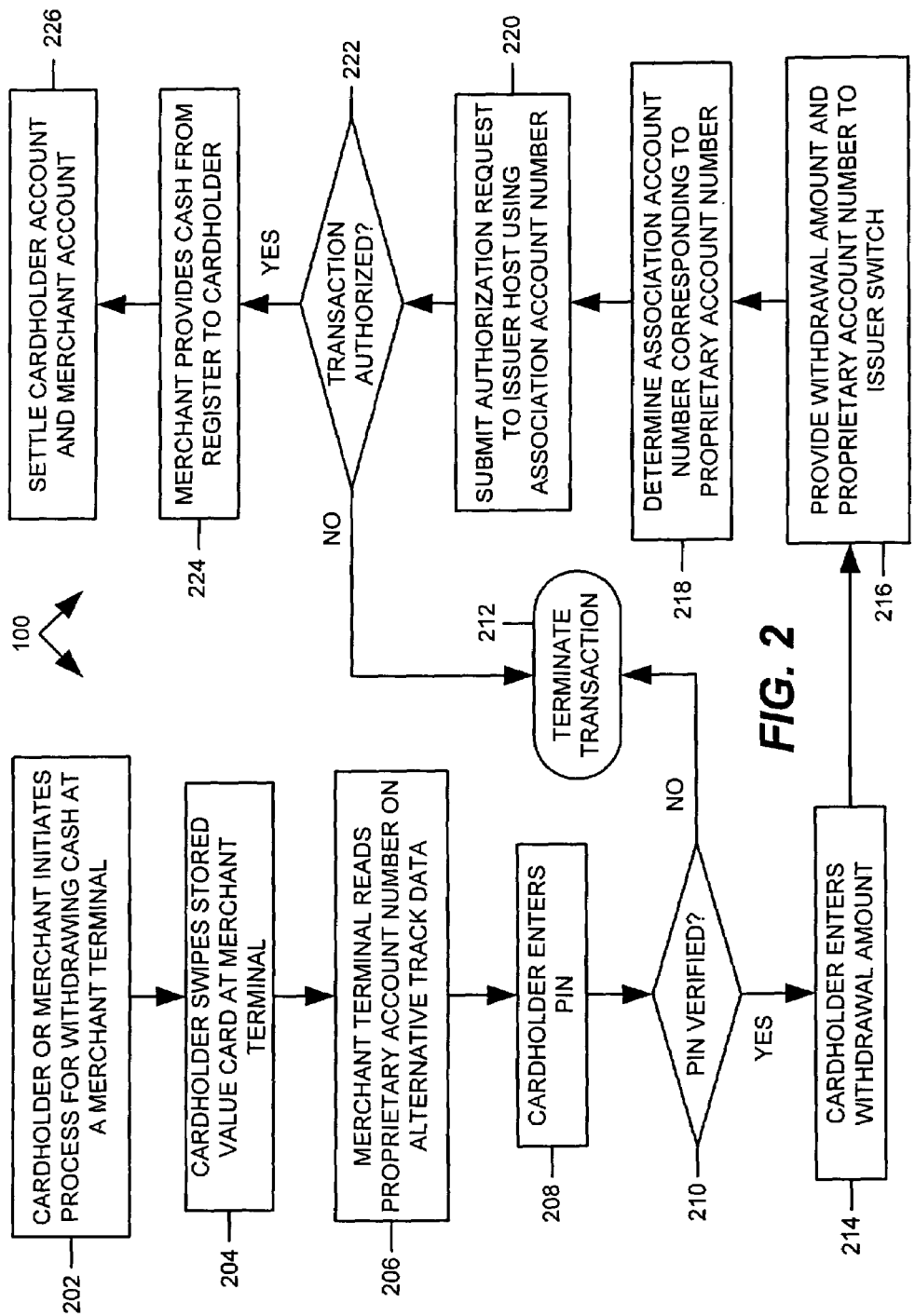
FIG. 2 is flow chart illustrating the operation, architecture, and/or functionality of the system of FIG. 1.

FIG. 2 illustrates the general operation of an embodiment of an OUCW transaction implemented in system 100. At block 202, the OUCW transaction is initiated by either cardholder 110 or merchant agent 108 via merchant terminal 102. The OUCW transaction may be initiated in various ways. For instance, merchant terminal 102 may comprise a user interface, interactive menu functionality, etc. that enables cardholder 110 and/or merchant agent 108 to select various account services, including the OUCW transaction. At block 204, cardholder 110 swipes financial services card 112 at merchant terminal 102 via a suitable data interface, magnetic reader, optical reader, etc. At block 206, merchant terminal 102 reads proprietary account number 308 from financial services card 112. As mentioned above, when the OUCW transaction—rather than an association-based transaction (e.g., retail purchase, etc.)—is being performed at merchant terminal 102, proprietary account number 308 is read instead of association account number 404. At block 208, cardholder 110 enters a personal identification number (PIN). At decision block 210, the PIN is verified. If cardholder 110 enters the incorrect PIN, the OUCW transaction is terminated at block 212. However, if cardholder 110 enters the correct PIN, the OUCW transaction continues.

At block 214, cardholder 110 specifies a withdrawal amount. The withdrawal amount may be entered by cardholder 110 at merchant terminal 102 or, in alternative embodiments, may be entered by merchant agent 108 after it is verbally provided by cardholder 110. At block 216, merchant terminal 102 provides the withdrawal amount and proprietary account number 308 to issuer switch 116 via communications network 118. At block 218, functionality at issuer switch 116 determines the association account number corresponding to proprietary account number 308. As illustrated at blocks 220 and 222, issuer switch 118 may initiate an authorization request to an issuer host 120 to determine whether the OUCW transaction is authorized. For instance, the OUCW transaction may not be authorized where cardholder account 128 does not have sufficient funds, credit, etc. to cover the requested withdrawal amount. If issuer host 128 declines the OUCW transaction, at block 212, the OUCW transaction is terminated. If issuer host 120 authorizes the OUCW transaction, at block 224, merchant terminal 102 receives notification that the OUCW transaction is authorized. Merchant agent 108 may then provide an appropriate amount of cash to cardholder 110 from merchant cash drawer 106. It should be appreciated that various types and/or amounts of fees may be applied to the transaction and, therefore, cardholder 110 may receive an amount different than the requested withdrawal amount. At block 226, merchant terminal 102 initiates a settlement process (e.g., via issuer switch 116, issuer host 120) to settle cardholder account 128, merchant account 122, etc. As known in the art, the settlement process may also involve settlement account 126 and/or issuer account 124. In this manner, the card issuer may develop various business relationships with merchants by which the transaction fees charged to cardholder 110 for the OUCW service are shared with the merchants.

Figure 5:
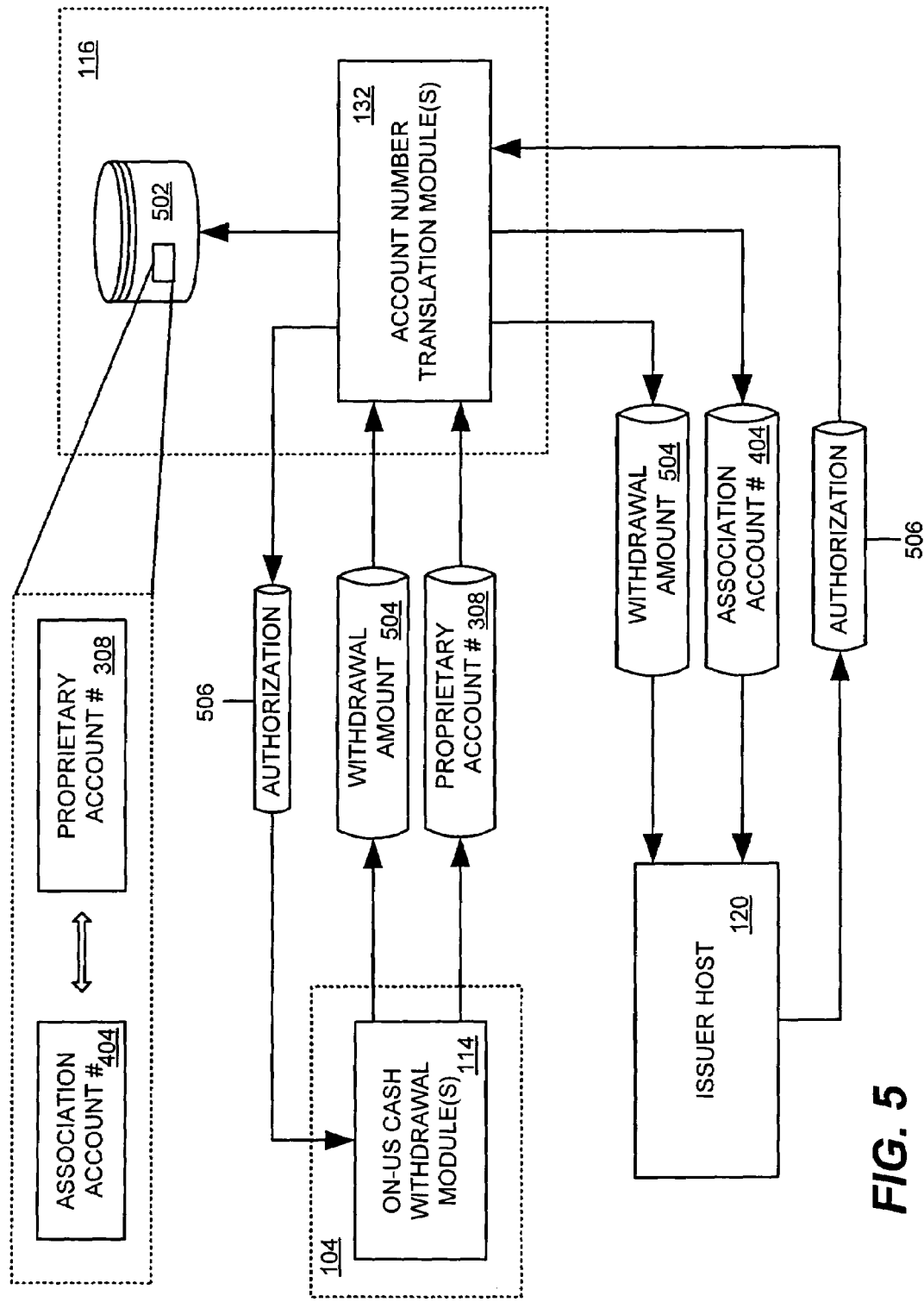
FIG. 5 is a functional block diagram illustrating another embodiment of a system for implementing an on-us cash withdrawal at a point-of-sale.
Figure 6:
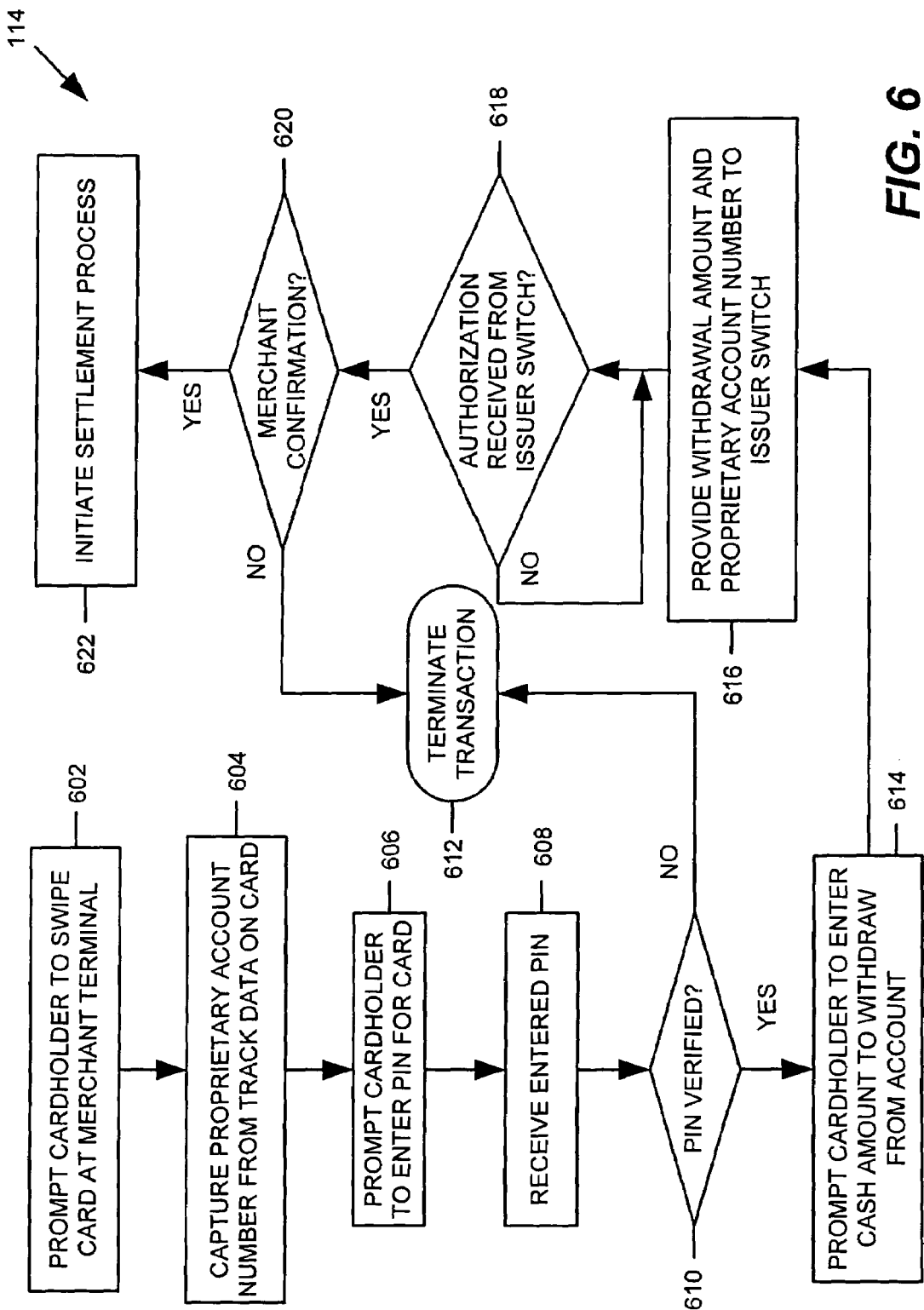
FIG. 6 is a flow chart illustrating the operation, architecture and/or functionality of the on-us cash withdrawal module(s) of the system of FIG. 5.
Figure 7:
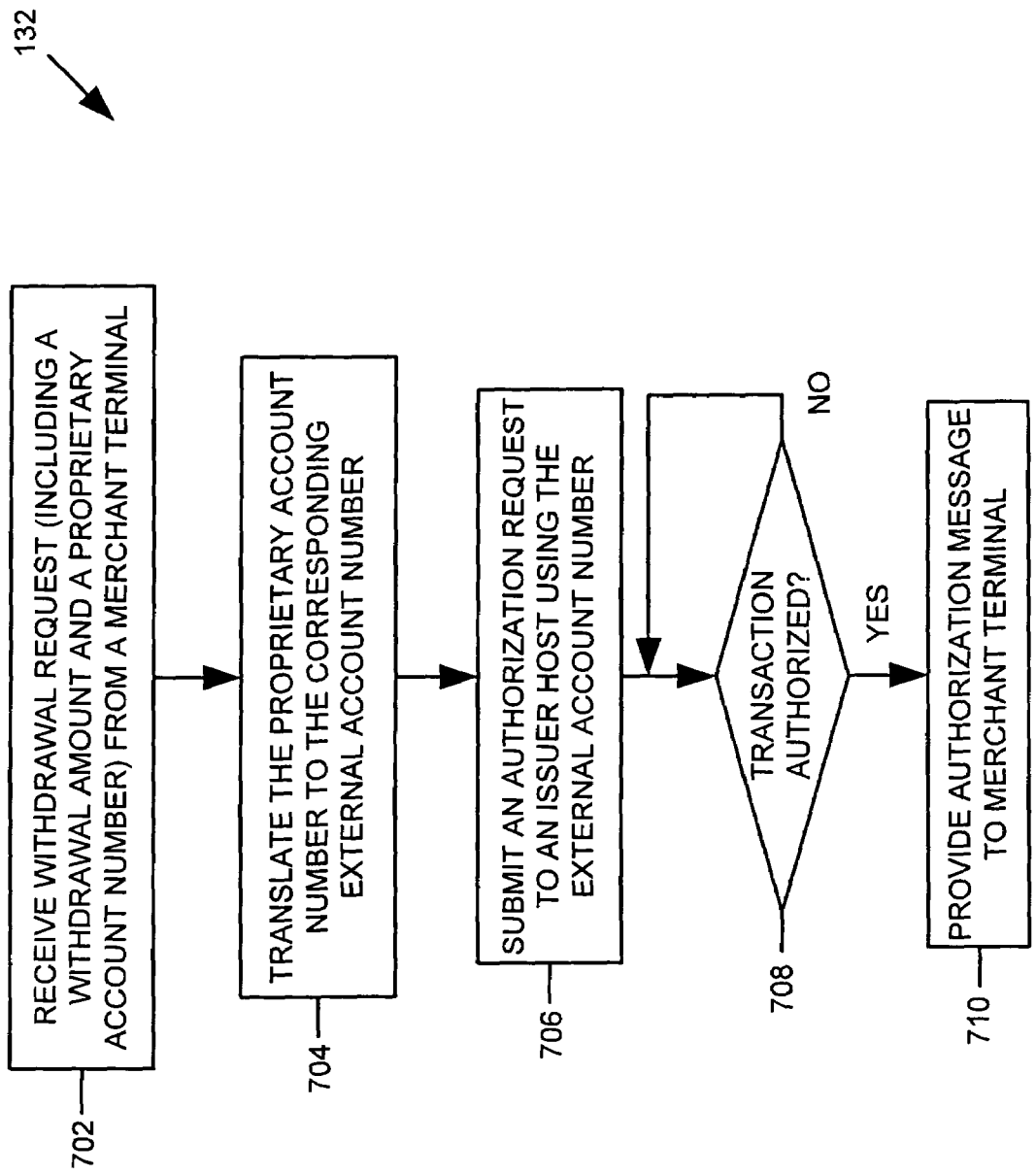
FIG. 7 is a flow chart illustrating the operation, architecture and/or functionality of the account number translation module(s) of the system of FIG. 5.

As mentioned above, the OUCW service is provided via communication between on-us cash withdrawal module(s) 114 located at merchant terminal 102 and account number translation module(s) 132 located at issuer switch 116. With reference to FIGS. 5-7, the architecture, operation, and/or functionality of one of a number of embodiments of module(s) 114 and account number translation module(s) 132, as well as the interaction there between, will be described. FIG. 5 is a functional block diagram of another embodiment of a system 100 for implementing the OUCW service. FIG. 6 illustrates the architecture, operation, and/or functionality of on-us cash withdrawal module(s) 114, while FIG. 7 illustrates the same for account number translation module(s) 132.

Referring to FIG. 6, after the OUCW service is initiated by cardholder 110 and/or merchant agent 108, at block 602, on-us cash withdrawal module(s) 114 prompt cardholder 110 to swipe financial services card 110 at merchant terminal 102. At block 604, on-us cash withdrawal module(s) 114 capture proprietary account number 308 from financial services card 110. It should be appreciated that proprietary account number 308 may be captured in various ways depending on the manner in which the corresponding data is stored (or otherwise embodied on financial services card 112). For example, as illustrated in FIGS. 3 & 4, proprietary account number 308 may be stored on track data associated with a magnetic strip 402 on the card. In this embodiment, on-us cash withdrawal module(s) 114 capture the data read from the appropriate track (e.g., track three data—FIG. 4). In alternative embodiments, proprietary account number 308 may be stored in a suitable memory and wirelessly transmitted to merchant terminal 102.

At block 606, on-us cash withdrawal module(s) 114 may prompt cardholder 110 to enter a PIN associated with financial services card 112. As illustrated by decision block 610, if the PIN is not verified, the OUCW transaction is terminated. It should be appreciated that, in one embodiment, the PIN verification process may occur locally at merchant terminal 102. In alternative embodiments, the verification process may occur via logic embodied at issuer switch 116, issuer host 120, etc. If the PIN is verified, however, the OUCW transaction continues to block 614 where on-us cash withdrawal module(s) 114 may prompt cardholder 110 (e.g., via a suitable user interface) to specify a cash amount to withdraw from cardholder account 128 (e.g., withdrawal amount 504—FIG. 5). At block 616, on-us cash withdrawal module(s) 114 provide withdrawal amount 504 and proprietary account number 308 to issuer switch 116 as a withdrawal request.

Referring to FIG. 7, at block 702, the withdrawal request may be received by (or further provided to) account number translation module(s) 132. As mentioned above and illustrated at block 704, account number translation module(s) 132 provide the logic or functionality for converting, translating, mapping, etc. proprietary account number 308 to the appropriate association account number. In the embodiment illustrated in FIG. 5, issuer host 116 may employ a database 502 that includes a look-up table which maps proprietary account numbers to the corresponding association account numbers. In this embodiment, account number translation module(s) 132 access the look-up table to determine the association account number 404 associated with the proprietary account number 308 contained in the withdrawal request. After the association account number 404 is identified, at block 706, issuer switch 116 may submit an authorization request to issuer host 120 using association account number 404—rather than proprietary account number 308. As illustrated at decision block 708, if the OUCW transaction is authorized, issuer host 120 may provide an authorization message 506 (FIG. 5) back to issuer switch 116. Authorization message 506 may be forwarded to on-us cash withdrawal module(s) 114.

Referring back to FIG. 6, if the OUCW transaction is authorized (e.g., authorization message 506 is received), at block 620, merchant agent 108 may be prompted to confirm the OUCW transaction. In this regard, on-us cash withdrawal module(s) 114 enable merchant agent 108 to override the authorization received from issuer host 120. After the merchant agent 108 provides the appropriate amount of cash to cardholder 110, at block 622, on-us cash withdrawal module(s) 114 may initiate the settlement process.

One of ordinary skill in the art will appreciate that OUCW module(s) 114 and account number translation module(s) 132 may be implemented in software, hardware, firmware, or a combination thereof. Accordingly, in one embodiment, OUCW module(s) 114 and account number translation module(s) 132 are implemented in software or firmware that is stored in a memory and that is executed by a suitable instruction execution system, processor, etc.

In hardware embodiments, OUCW module(s) 114 and account number translation module(s) 132 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be further appreciated that the process descriptions or functional blocks related to FIGS. 1-7 represent modules, segments, or portions of logic, code, etc. which include one or more executable instructions for implementing specific logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, OUCW module(s) 114 and account number translation module(s) 132 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A method for providing a cash withdrawal service at a point-of-sale, the method comprising:
   providing an association-branded financial card to a cardholder which stores both a proprietary account number and an association account number, the proprietary account number corresponding to an issuer of the financial card and the association account number corresponding to an association network;
   initiating an on-us cash withdrawal transaction at a point-of sale terminal using the association-branded financial card, wherein the on-us cash withdrawal transaction comprises an electronic transaction which is acquired by the issuer of the financial card rather than the association network; and
   electronically providing the on-us cash withdrawal transaction using both the association account number and the proprietary account number by:
      in response to the initiation of the on-us cash withdrawal transaction, the point-of-sale terminal electronically reading the proprietary account number without reading the association account number;
      the point-of-sale terminal determining a cash withdrawal amount for the on-us cash withdrawal transaction to be withdrawn from an account associated with the association-branded financial card;
      the point-of-sale terminal providing the proprietary account number and the cash withdrawal amount to a switch associated with the issuer of the association-branded financial card without electronically accessing the association network;
      the switch determining the association account number based on the proprietary account number; and
      the issuer electronically authorizing the cash withdrawal amount based on the association account number without electronically accessing the association network.

2. The method of claim 1, wherein the association-branded financial card comprises a stored value card.

3. The method of claim 1, wherein the determining the proprietary account number associated with the association-branded financial card comprises reading data from a track in a magnetic strip of the association-branded financial card.

4. The method of claim 1, wherein the providing the proprietary account number and the cash withdrawal amount to a switch comprises submitting an authentication request to the switch.

5. The method of claim 1, wherein the determining the association account number based on the proprietary account number involves a look-up table at the switch.

6. The method of claim 1, wherein the authorizing the cash withdrawal amount comprises submitting an authorization request to a host.

* * * * *